(12) United States Patent
Zechlin et al.

(10) Patent No.: US 8,374,191 B2
(45) Date of Patent: Feb. 12, 2013

(54) ALLOCATION OF A COMMUNICATIONS CHANNEL TO A DATA TRANSFER SESSION

(75) Inventors: Christian Zechlin, Herne (DE); Eugen Palnau, Dortmund (DE)

(73) Assignee: Nokia Corporation, Espoo (FI)

( * ) Notice: Subject to any disclaimer, the term of this patent is extended or adjusted under 35 U.S.C. 154(b) by 314 days.

(21) Appl. No.: 12/225,031

(22) PCT Filed: Mar. 14, 2006

(86) PCT No.: PCT/IB2006/001144
§ 371 (c)(1),
(2), (4) Date: Dec. 29, 2008

(87) PCT Pub. No.: WO2007/105026
PCT Pub. Date: Sep. 20, 2007

(65) Prior Publication Data
US 2009/0303906 A1 Dec. 10, 2009

(51) Int. Cl.
*H04B 7/212* (2006.01)
(52) U.S. Cl. ........................................... 370/443
(58) Field of Classification Search .................. None
See application file for complete search history.

(56) References Cited

U.S. PATENT DOCUMENTS

| | | | | |
|---|---|---|---|---|
| 5,559,803 A * | 9/1996 | Sakai et al. | | 370/449 |
| 5,583,866 A * | 12/1996 | Vook et al. | | 370/312 |
| 5,691,709 A * | 11/1997 | Guntin | | 370/346 |
| 6,185,197 B1 * | 2/2001 | Yeung et al. | | 370/328 |
| 6,385,207 B1 * | 5/2002 | Woundy | | 370/410 |
| 6,545,994 B2 * | 4/2003 | Nelson et al. | | 370/337 |
| 6,587,443 B1 * | 7/2003 | Dutta | | 370/322 |
| 6,795,449 B1 * | 9/2004 | Kim | | 370/443 |
| 7,086,082 B1 * | 8/2006 | Kokkinen | | 725/135 |
| 7,185,045 B2 * | 2/2007 | Ellis et al. | | 709/200 |
| 7,403,538 B1 * | 7/2008 | Ho | | 370/443 |
| 2001/0033579 A1 * | 10/2001 | Nelson et al. | | 370/447 |
| 2003/0081599 A1 * | 5/2003 | Wu et al. | | 370/389 |
| 2004/0008722 A1 * | 1/2004 | Ellis et al. | | 370/461 |
| 2004/0264381 A1 | 12/2004 | Banerjee et al. | | 370/252 |
| 2005/0259617 A1 * | 11/2005 | Wason et al. | | 370/329 |
| 2006/0088048 A1 * | 4/2006 | Bahl | | 370/458 |
| 2007/0076739 A1 * | 4/2007 | Manjeshwar et al. | | 370/432 |

OTHER PUBLICATIONS

"Efficient Polling Schemes for Bluetooth Picocells Revisited", Ka Lok Chan, et al., IEEE 2004, 8 pgs.

* cited by examiner

*Primary Examiner* — Fan Ng
(74) *Attorney, Agent, or Firm* — Harrington & Smith

(57) ABSTRACT

A method of allocating a communications channel to a data transfer session, the method including during the data transfer session: sending a first data transfer session packet via the communications channel then sending an additional packet or packets, that are not a part of the data transfer session, via the communications channel to hold the communications channel for the data transfer session.

30 Claims, 3 Drawing Sheets

ALLOCATION OF A COMMUNICATIONS CHANNEL TO A DATA TRANSFER SESSION

FIELD OF THE INVENTION

Embodiments of the present invention relate to allocation of a communications channel to a data transfer session. In particular, they relate to allocating a communications channel to a data transfer session between a Master device and a Slave device, such as in a Bluetooth piconet.

BACKGROUND TO THE INVENTION

FIG. 1 illustrates a Bluetooth piconet 1. This is an ad-hoc radio communications network controlled by a Master device 2, and including the Master device 2 and up to seven Slave devices 4, 6, 8, 10. The devices of the piconet 1 are synchronised to a common time reference 20 as illustrated in FIG. 2. The common time reference is synchronised to the Bluetooth clock of the Master device 2.

As illustrated in FIG. 2, communications in the piconet 1 occur as a sequence of packet data units (PDU) 22. The PDUs 22 are communicated in a time division duplex (TDD) fashion. The common time reference 20 is divided into a series of TDD frames 30. Each TDD frame comprises two time slots. The first time slot 31 of a TDD frame is allocated to the Master 2 of the piconet 1. Only the Master 2 can begin transmission of a PDU in the first slot 31 of a TDD frame 30. The second slot 32 of a TDD frame 30 is allocated to a single Slave in the piconet 1. Only that allocated Slave can begin transmitting a PDU 22 in the second time slot 32 of the TDD frame 30. Only the Slave addressed in the first time slot 31 of a TDD frame 30 can reply in the second time slot 32 of that TDD frame 30.

A PDU 22 comprises a header and a payload. An access code of the header identifies the Master of the piconet and an address within the header identifies the device addressed. The access code within the header is also used for maintaining synchronisation to the common time reference 20 at each of the devices within the piconet 1. Accurate time synchronisation is necessary as the piconet 1, according to the Bluetooth standard, uses fast frequency hopping and it is imperative that the Master and Slaves hop together.

Referring to FIG. 2, the Master 2 at slot 31A sends a PDU to the Slave S1. This enables the Slave S1 to reply with a PDU sent to the Master 2 in slot 32A. The Master 2 sends a second PDU 22 in time slot 31B which also enables the Slave S1 in time slot 32 to reply. However, the Slave S1 is not obliged to reply. In time slot 31C, the Master 2 sends a PDU 22 to the Slave S3, which replies with a PDU 22 in a time slot 32. In time slot 31D, the Master 2 sends a PDU 22 to the Slave S2, which replies in the immediately following time slot 32D with a PDU 22.

It will therefore be appreciated that a single communication channel exists within the piconet 1. This communication channel operates in a TDD fashion and includes a downlink channel from the Master 2 in a first slot 31 of a TDD frame 30 and an uplink channel to the Master in the second slot 32 of that TDD frame 30. The communication channel may be allocated to a particular Slave by having the Master poll that Slave, by sending a PDU addressed to it, in the first time slot of a TDD frame 30.

In order to maintain synchronisation within the piconet 1, the Bluetooth Master device 2 typically polls a Slave at least every 25 ms. Consequently, by default, the communications channel will be allocated to a Slave at least once every 25 ms.

FIG. 3 illustrates an example of an asynchronous data transfer protocol. In this example the asynchronous data transfer protocol is the OBEX (Object Exchange) protocol. This is a compact binary protocol originally developed by the Infrared Device Association (IrDA) for infrared communication that can be used with other transport mechanisms, such as Bluetooth. OBEX performs a function similar to HTTP but is less resource intensive. The OBEX protocol is a session-orientated protocol, in that a session is initiated for data transfer and is then terminated when data transfer is complete. During a session, an OBEX client 40 pushes a data block using the PUT command to a server 42. The server 42 acknowledges receipt of the data block contained within the PUT command by sending a CONTINUE response to the client 40. The client 40, after receiving the CONTINUE response for the previous data block transfer, proceeds with the next data block transfer by sending another PUT command 50 to the server 42, which will acknowledge receipt by returning a CONTINUE response 52. Because of the asynchronous nature of the data transfer protocol, there may be a delay at the server between the receipt of a PUT command 50 and the transmission of a CONTINUE response 52. Likewise, there may be a delay at the client 40 between the receipt of a CONTINUE response 52 and the transmission of the next PUT command 50.

The OBEX protocol may be used to transfer data using Bluetooth PDUs as the transport mechanism. However, the latency between the receipt of a PUT command and the production of a CONTINUE response at the server 42 may be greater than a TDD frame duration (1.25 ms). Likewise, the latency at the client 40 between the receipt of a CONTINUE response 52 and the production of the next PUT command 50 may be greater than a TDD frame duration (1.25 ms).

Consequently, if the Master device 2 is operating as the client 40, and it sends a PUT command 50 to a server 42 acting as a Slave in a first slot 31 of a TDD frame 30, the server 42 is unlikely to be able to reply with a CONTINUE response 52 in the second slot 32 of that TDD frame 30. Consequently, the OBEX server 42 acting as the Slave device, will have to wait until it is next polled by the Master before it can send the CONTINUE response 52 back to the OBEX client 40. This will typically be a delay of 25 ms.

If the Master 2 is operating as the OBEX server 42, it is unlikely that the OBEX client 40, acting as the Slave, will be able to respond to a received CONTINUE response 52 sent in the first slot 31 of a TDD frame 30 by sending a PUT command 50 in the immediately following second time slot 32 of that TDD frame 30. Consequently, the OBEX client 40, operating as a Slave device, will have to wait until it is polled by the Master device 2 before it can provide the next PUT command 50 to the OBEX server 42.

It is therefore apparent that significant delays can occur if large amounts of data need to be transmitted using an asynchronous data transfer protocol between a Master device and a Slave device, in particular, where the Master device grants the Slave device access to a communication channel on a transaction by transaction basis.

BRIEF DESCRIPTION OF THE INVENTION

According to one embodiment of the invention there is provided a method of allocating a communications channel to a data transfer session, the method comprising during the data transfer session: sending a first data transfer session packet via the communications channel then sending an additional packet or packets, that are not a part of the data transfer session, via the communications channel to reserve the communications channel for the data transfer session.

Each additional packet reserves the communications channel. The communication channel may be reserved as needed by sending additional packets or may be reserved continuously. Continuous reservation of the communications channel in each TDD frame 'holds' the communications channel. 'Holding' in this sense means that the communication channel remains unavailable for uses other than the data transfer while the channel is held.

The data transfer session may be an asynchronous data transfer session, such as that provided by OBEX, in which data is transferred by a series of data/ack message pairs. The first data transfer session packet may include a data message or an ack message as a payload. The additional packet or packets may be a packet without a payload such as an RFCOMM packets with no payload. The additional packet or packets are transparent/redundant from the perspective of actual data transfer.

According to another embodiment of the present invention there is provided a device operable to use a communications channel to transfer data during a data transfer session, comprising: a controller operable during a data transfer session to control the sending of a first data transfer session packet via the communications channel and the subsequent sending of an additional packet or packets, that are not a part of the data transfer session, via the communications channel to reserve the communications channel for the data transfer session.

According to a further embodiment of the present invention there is provided a computer program comprising program instructions for enabling a device, during a data transfer session, to send a first data transfer session packet via a communications channel and to subsequently send an additional packet or packets, that are not a part of the data transfer session, via the communications channel to reserve the communications channel for the data transfer session.

According to a still further embodiment of the present invention there is provided a chipset arranged to control, during a data transfer session, the sending of a first data transfer session packet via a communications channel and the subsequent sending of an additional packet or packets, that are not a part of the data transfer session, via the communications channel to reserve the communications channel for the data transfer session.

According to another embodiment of the present invention there is provided a method of transferring first data during a data transfer session comprising: sending data from a sender in a sequence of first packets interspersed with second packets sent from the sender via a communications channel, wherein the first packets transfer the first data and the second packets do not transfer the first data but repeatedly reserve the communications channel.

According to another embodiment there is provided a method of allocating a communications channel to a data transfer session, the method comprising during the data transfer session: sending, from a Master device to a Slave device, a first data transfer session packet via the communications channel then sending polls to the Slave device to reserve the communications channel for a second data transfer session packet sent by the Slave device to the Master device in reply to the first data transfer session packet.

BRIEF DESCRIPTION OF THE DRAWINGS

For a better understanding of the present invention reference will now be made by way of example only to the accompanying drawings in which.

DETAILED DESCRIPTION OF THE INVENTION

Each of FIGS. 4A, 4B, 4C and 4D illustrate a method of allocating a communications channel to a data transfer session, the method comprising during the data transfer session: sending a first data transfer session packet (50 in FIGS. 4A and 4B, 52 in FIGS. 4C and 4D) via the communications channel then sending an additional packet or packets (60), that are not a part of the data transfer session, via the communications channel to hold the communications channel for the data transfer session.

FIGS. 4A, 4B, 4C and 4D illustrate portions of asynchronous data transfer sessions in which transfer data is sent in 'DATA' messages contained in one or more PDUs 50 ('DATA' PDU(s)) and the receipt of a DATA message is acknowledged by returning an 'ACK' message contained in one or more PDUs 52 (ACK PDU(s)). If the OBEX data transfer protocol is used, the data sender 40 is the OBEX client, the data receiver 42 is the OBEX server, the PUT command is the DATA message and the CONTINUE response is the ACK message.

Figure 1:
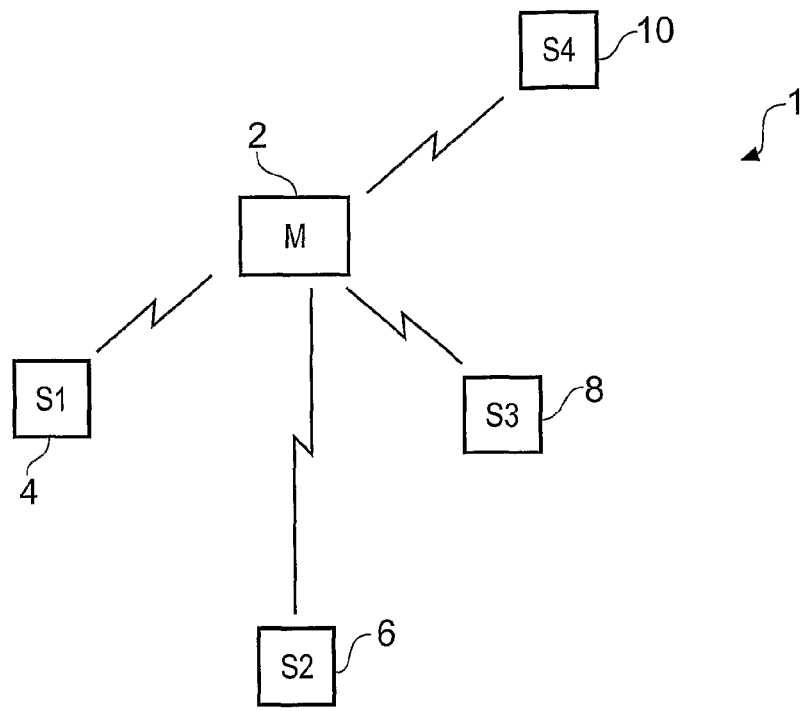
FIG. 1 illustrates a Bluetooth piconet.
Figure 2:
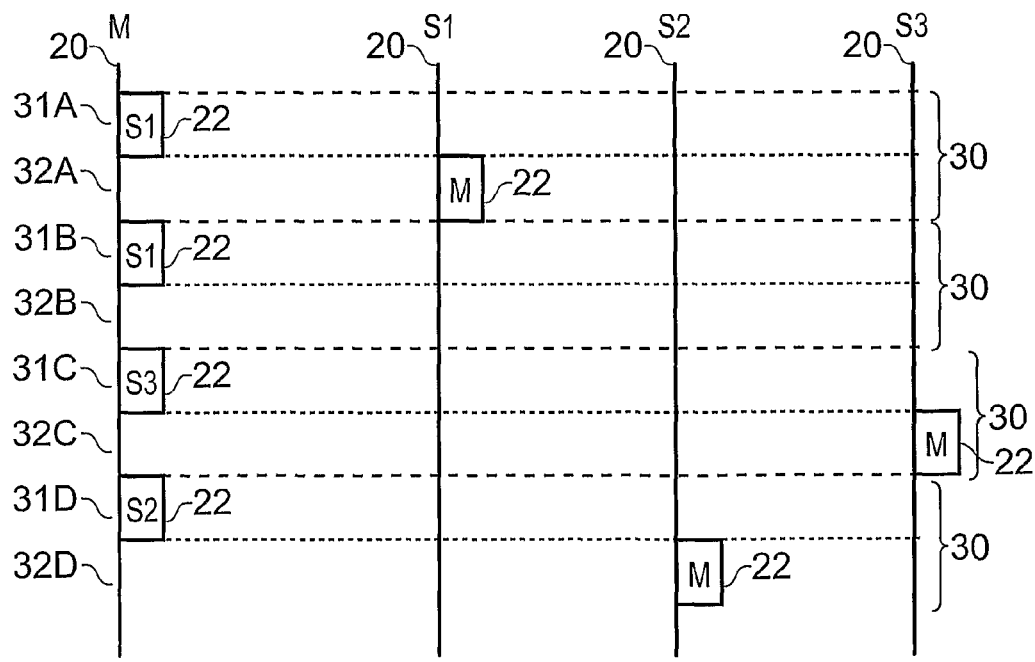
FIG. 2 illustrates a common time reference of the Bluetooth piconet and the use of time slots to transfer packet data units.
Figure 3:
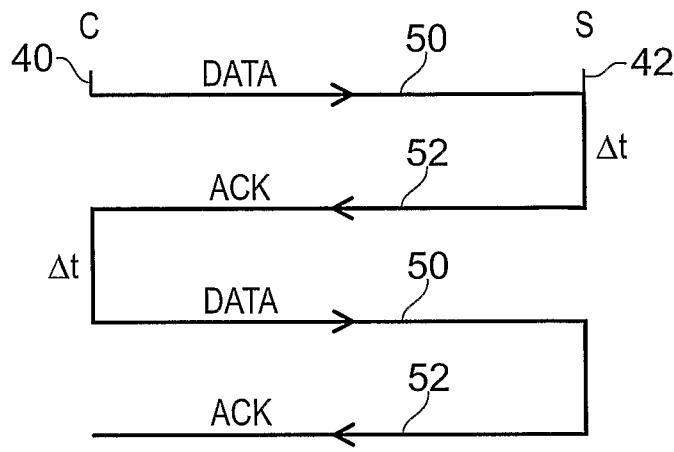
FIG. 3 illustrates an asynchronous data transfer session.
Figure 4A:
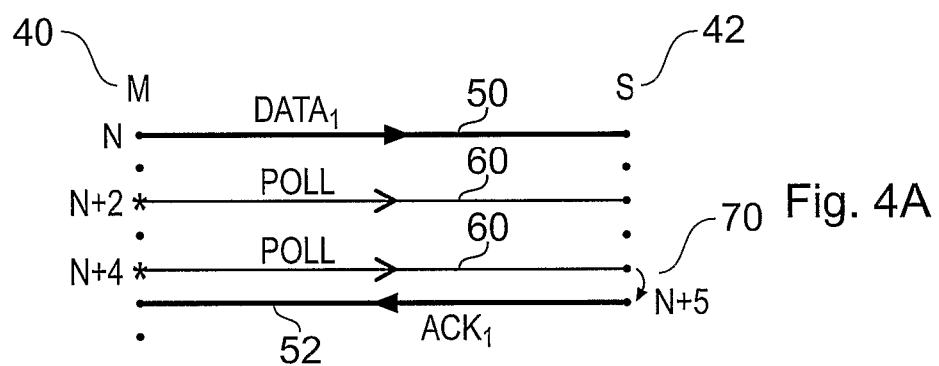
FIGS. 4A, 4B, 4C and 4D illustrate embodiments of the present invention.

Referring to FIG. 4A, the Master M of the piconet is operating as a data sender 40 and a Slave S is operating as a data receiver 42 in an asynchronous data transfer session.

At time slot N, the data sender sends a final DATA PDU 50 in a DATA message to the Slave S containing a transfer data block in its payload. The data sender 40 (Master M) continues to send PDUs 60 to the Slave S in each of the following TDD frames 30 at time slots N+2m, where m=1, 2, 3 . . . until it receives an ACK PDU 52 in reply from the data receiver 42.

The PDUs 60 have payloads that do not contain transfer data and are transparent to the asynchronous data transfer session.

At the Slave S, the receipt of a PDU 60 addressed to the Slave S from the Master M in a first time slot 31 of a TDD frame 30 allocates the communication channel to the addressed Slave S and enables the Slave S to reply in the second time slot 32 of that TDD frame 30. The allocation/enablement is schematically illustrated in the FIG using the reference 70.

Consequently, by repeatedly sending PDUs 60 to the Slave S, the Master 2 holds the communications channel for use by the Slave S. The Slave S can therefore immediately use the communications channel to transfer the ACK PDU 52 as soon as it is available. In the illustrated example, the ACK PDU 52 is sent in time slot N+5.

Figure 4B:
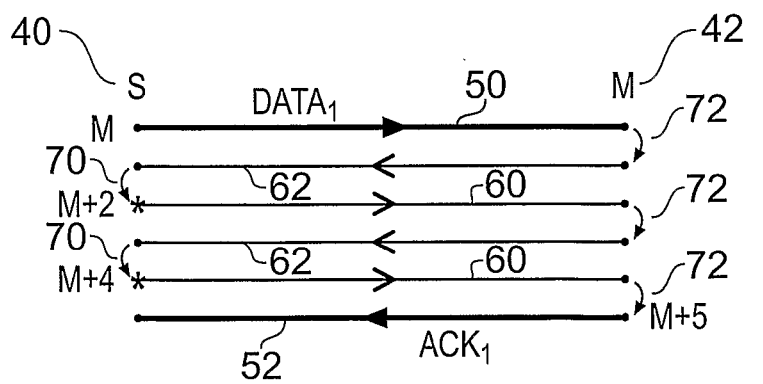

Referring to FIG. 4B, the situation differs from that illustrated in FIG. 4A in that the data sender 40 is a Slave device as opposed to a Master device. The Slave S of the piconet is operating as a data sender 40 and the Master M is operating as a data receiver 42 in the asynchronous data transfer session. As the data sender 40 is a Slave it needs to be granted access to the communications channel by the Master M for each frame it uses for transmission.

The Master device M is arranged so that whenever it receives a PDU, during the data transfer session, from a Slave S in a TDD frame 30, it allocates the next TDD frame to that Slave by polling that Slave in the first time slot 31 of the next TDD frame 30. "Polling" in this context means sending a PDU, such as PDU 62, that is addressed to the Slave. This functionality is illustrated with the reference numeral 72 in FIG. 4B and the poll is illustrated with the reference numeral 62.

At the Slave S, the receipt of a PDU, such as poll 62, addressed to the Slave S from the Master M in a first time slot 31 of a TDD frame 30 allocates the communication channel to the addressed Slave S and enables the Slave S to reply in the second time slot 32 of that TDD frame 30. The allocation/enablement is schematically illustrated in the FIG using the reference 70.

At time slot M, the data sender 40 sends a final DATA PDU 50 in a DATA message to the Master M containing a transfer data block in its payload.

The Master M consequently responds 72 to the receipt of the final DATA PDU 50 by granting the Slave S access to the communications channel by sending a poll 62 to the Slave S in reply.

The data sender 40 (Slave S) uses the allocation 70 of access to the communications channel to send a PDU 60 to the data receiver 42 (the Master M) whether or not transfer data is available. The PDUs 60 have payloads that do not contain transfer data and are transparent to the asynchronous data transfer session.

Consequently, as in FIG. 4A, the data sender 40, after sending a final DATA PDU 50 of a DATA message to the data receiver 42, holds the communications channel by sending PDUs 60 to the Master M in each of the following TDD frames 30 at time slots M+2m, where m=1, 2, 3 . . . until it receives an ACK PDU 52 in reply from the data receiver 42 (Master M). The PDUs 60 cause the Master M to repeatedly send polls 62 in reply which hold the communications channel for use by the Slave S. The Slave S by replying to the polls with PDUs 60 prompts the Master M to send the polls. The communication channel is therefore immediately available when the data receiver 42 (the Master M) has the ACK message ready to send back to the Slave S. There is consequently minimal delay in the ACK message being returned to the Slave S as SCK PDU 52.

Figure 4C:
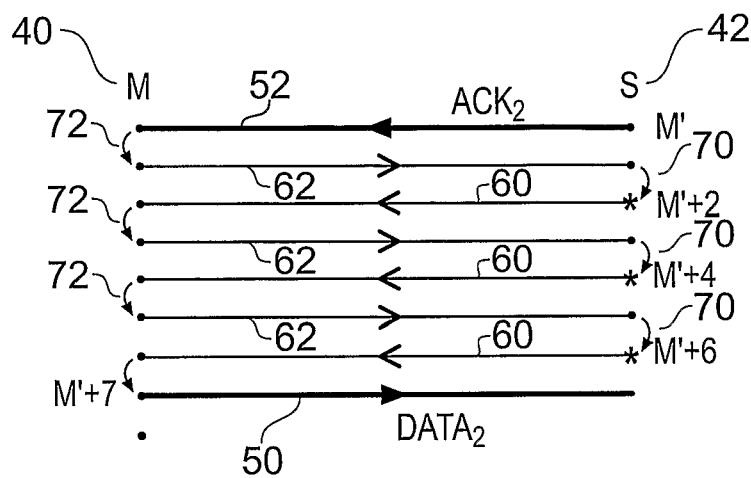

Referring to FIG. 4C, the situation differs from that illustrated in FIG. 4A in that it illustrates the time period between a final ACK PDU 52 of an ACK message and a first DATA PDU in a DATA message as compared to the time period between a final DATA PDU and a first ACK PDU in an ACK message.

A Slave S of the piconet is operating as a data receiver 42 and the Master M is operating as a data sender 40 in the asynchronous data transfer session. The Slave S needs to be granted access to the communications channel by the Master M for each frame it uses for transmission.

The Master M is arranged so that whenever it receives a PDU, during the data transfer session, from a Slave S in a TDD frame 30, it allocates the next TDD frame to that Slave by polling that Slave in the first time slot 31 of the next TDD frame 30. "Polling" in this context means sending a PDU, such as a PDU 62, that is addressed to the Slave. This functionality is illustrated with the reference numeral 72 in FIG. 4C and the poll is illustrated with the reference numeral 62.

At the Slave S, the receipt of a poll, such as PDU 62 addressed to the Slave S from the Master M in a first time slot 31 of a TDD frame 30 allocates the communication channel to the addressed Slave S and enables the Slave S to reply in the second time slot 32 of that TDD frame 30. The allocation/enablement is schematically illustrated in the FIG using the reference 70.

At time slot M', the data receiver 42 sends a final ACK PDU 52 of an ACK message to the Master M.

The Master M consequently responds 72 to the receipt of the ACK PDU 52 by granting the Slave S access to the communications channel by sending a poll 62 to the Slave S in reply.

The data receiver 42 (Slave S) uses the allocation 70 of access to the communications channel to send a PDU 60 to the data sender 40 (the Master M). The PDUs 60 have payloads that do not contain transfer data and are transparent to the asynchronous data transfer session.

Consequently, the data receiver 42, after sending a final ACK PDU 52 of an ACK message to the data sender 40, holds the communications channel by sending PDUs 60 to the Master M in each of the following TDD frames 30 at time slots M'+2m; where m=1, 2, 3 . . . until it receives another DATA PDU 50 or the data transfer session ends. The PDUs 60 cause the Master M to repeatedly send polls 62 in reply which hold the communications channel for use by the Slave S. The Slave S by replying to the polls with PDUs 60 prompts the Master M to send the polls. The communication channel is therefore immediately available when the data sender 40 (the Master M) has a DATA message ready to send to the Slave S. There is consequently minimal delay in the DATA message being sent to the Slave S as DATA PDU 50.

Figure 4D:
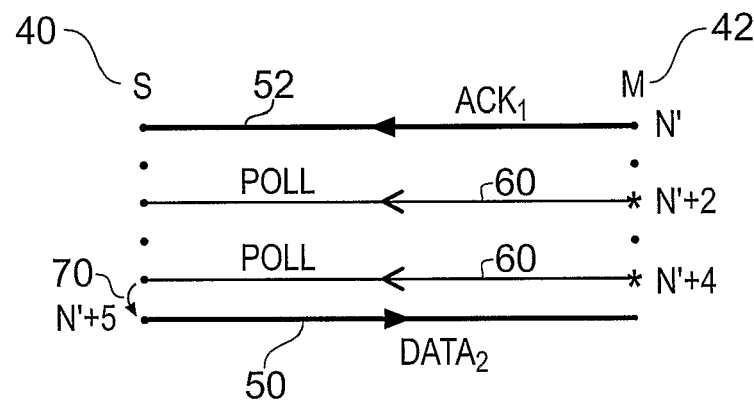

Referring to FIG. 4D, the situation differs from that illustrated in FIG. 4B in that it illustrates the time period between a final ACK PDU 52 of an ACK message and a first DATA PDU of a next DATA message as compared to the time period between a final DATA PDU of a DATA message and a first ACK PDU of an ACK message.

The Master M of the piconet is operating as a data receiver 42 and a Slave S is operating as a data sender 40 in an asynchronous data transfer session.

At time slot N', the data receiver 42 sends a final ACK PDU 52 of an ACK message to the Slave S. The data sender 40 (Master M) continues to send PDUs 60 to the Slave S in each of the following TDD frames 30 at time slots N'+2m, where m=1, 2, 3 . . . until it receives a DATA PDU 50 or the data transfer session ends.

The PDUs 60 have payloads that do not contain transfer data and are transparent to the asynchronous data transfer session.

At the Slave S, the receipt of a PDU 60 addressed to the Slave S from the Master M in a first time slot 31 of a TDD frame 30 allocates the communication channel to the addressed Slave S and enables the Slave S to reply in the second time slot 32 of that TDD frame 30. The allocation/enablement is schematically illustrated in the FIG using the reference 70.

Consequently, by repeatedly sending PDUs 60 to the Slave S, the Master 2 holds the communications channel for use by the Slave S. The Slave S can therefore immediately use the communications channel to transfer the next DATA PDU 50 as soon as it is available, In the illustrated example, the ACK PDU 52 is sent in time slot N'+5.

It will therefore be appreciated from the description of FIGS. 4A-4D that after a device sends a data transfer session packet, it will continue to hold the communications channel by repeatedly sending PDUs 60 in subsequent TDD frames 30. In the examples of FIGS. 4A and 4B, the data transfer session packet is a DATA PDU 50. In the example of FIG. 4A, the PDU 60 holds the communication channel as it is sent by the Master and in the example of FIG. 4B, the PDU 60 prompts a poll 62 from the Master which holds the communication channel. In the examples of FIGS. 4C and 4D, the data transfer session packet is an ACK PDU 52. In the example of FIG. 4*b*, the PDU 60 holds the communication channel as it is sent from the Master and in the example of FIG. 4C, the PDU 60 prompts a poll 62 from the Master which holds the communication channel. The PDUs have the consequence of either allocating the communications channel to the Slave S, if sent by the Master, or causing the Master to allocate the communications channel to the Slave S if sent by the Slave. The PDUs 60 may be RFCOMM packets with no payload. It should be appreciated that each of FIGS. 4A, 4B, 4C and 4D relate to independent processes for holding a communication channel for use in a data transfer session, and as such an embodiment of the invention may use one or more of those independent processes in any combination. That is, an implementation of the invention does not have to use all of the processes described in FIGS. 4A to 4D.

Although in the preceding paragraphs it has been described that the PDUs 60 are sent in every TDD frame 30, this need not always be the case. For example, if it is the Master M that is sending the PDU 60, it can be sent with any time interval as the Master controls allocation of the communication channel. The PDUs 60 may therefore be sent periodically but not every TDD frame.

Although in the preceding embodiments, the PDUs 60 are sent in every TDD frame, in other embodiments they may be sent less frequently, in particular in the processes illustrated in FIGS. 4A and 4D, where the Master M sends the PDUs 60, they may be sent by the Master at will with any chosen periodicity or even randomly also depending on other tasks of the master like exchanging packets with other slaves. However, the PDUs 60 will be sent more often than every 25 ms. Thus the Master M may have two operational states—a data transfer state and a non-data transfer state. In the data transfer state, a data transfer is on-going with a Slave S, and the Master after sending a final PDU 50, 52 of a data transfer message sends PDUs 60 to the Slave S more often than every 25 ms up to a maximum frequency of every TDD frame. In the non-data transfer state; a data transfer is not on-going with a Slave S, and the Master polls the Slave S every 25 ms. The Master may enter the data transfer state when a message or messages for a Slave are being buffered for transmission and may return to the non-data transfer state when the buffer does not contain message for the Slave.

Figure 5A:
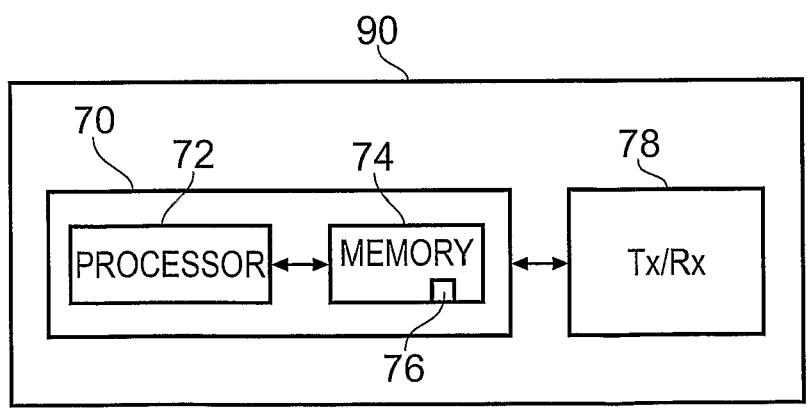
FIG. 5A schematically illustrates a device and computer program for carrying out an embodiment of the invention.

FIG. 5A schematically illustrates suitable components for a device 90 that is operable as a Master M or Slave S of a Bluetooth piconet. The device 90 is operable to use a Bluetooth communications channel to transfer data during a data transfer session.

A device controller 70 is operable during a data transfer session to control the sending of a first data transfer session packet (via the communications channel) and the subsequent sending of an additional packet or packets, that are not a part of the data transfer session, via the communications channel to hold the communications channel for the data transfer session.

The controller 70 may comprise a processor 72 and a memory 74 accessible by the processor 72 or it may be an ASIC or similar. The controller 70 is connected to a radio transceiver 78.

The memory 74 may comprise a computer program 76 comprising program instructions for enabling a device, during a data transfer session, to send a first data transfer session packet via a communications channel and to subsequently send an additional packet or packets, that are not a part of the data transfer session, via the communications channel to hold the communications channel for the data transfer session.

The computer program instructions may arrive at the device 90 via an electromagnetic carrier signal or be copied from a physical entity such as a computer program product, a memory device or a record medium such as a CD-ROM or DVD.

Figure 5B:
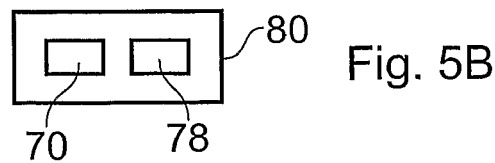
FIG. 5B schematically illustrates a chip-set for carrying out an embodiment of the invention.

The controller 70 and radio transceiver 78 may be part of a chipset 80 as illustrated in FIG. 5B that is sold for integration within a device. Such a chipset is arranged to control, during a data transfer session, the sending of a first data transfer session packet via a communications channel and the subsequent sending of an additional packet or packets, that are not a part of the data transfer session, via the communications channel to hold the communications channel for the data transfer session.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   during a data transfer session,
   sending, via a communications channel to a destination, a first data transfer session packet, then
   sending, via the communications channel to the destination, a series of additional packets to reserve, for multiple consecutive time slots, the communications channel for a second data transfer packet sent from the destination via the communications channel in response to the first data transfer session packet, wherein the additional packets are different to the first data transfer session packet.

2. A method as claimed in claim 1, wherein the communication channel is between a first device operating as a master and a second device operating as a slave, wherein a slave is configured to send a packet to the master only in response to a poll from the master.

3. A method as claimed in claim 1, wherein the communication channel is a time division duplex channel comprising frames having a downlink time slot and an uplink time slot.

4. A method as claimed in claim 1, wherein the communication channel is between a first device operating as a master and a second device operating as a slave, wherein a slave is configured to send a packet to the master only in response to a poll from the master, wherein the communication channel is a time division duplex channel comprising frames having a downlink time slot and an uplink time slot and wherein the latency between the receipt of a message in a data transfer protocol and the transmission of a message in reply is greater than a frame duration.

5. A method as claimed in claim 1, wherein the data transfer session uses an asynchronous data transfer protocol.

6. A method as claimed in claim 5, wherein the latency between the receipt of a message in the asynchronous data transfer protocol and the transmission of the next message in the asynchronous data transfer protocol is greater than 1.25 ms.

7. A method as claimed in claim 1, wherein the data transfer session is for transferring first data and comprises sending a sequence of packets including data transfer session packets interspersed with additional packets wherein the first data transfer session packets transfer the first data and the additional packets do not transfer the first data but repeatedly reserve the communications channel.

8. A method as claimed in claim 1 comprising sending a data transfer session packet, then repeatedly sending additional packets until receipt of an acknowledgement of receipt of the data transfer session packet.

9. A method as claimed in claim 1 wherein the first data transfer session packet is a final packet of an OBEX, Object Exchange Protocol, PUT command.

10. A method as claimed in claim 1, wherein the additional packets are polls sent by a Master.

11. A method as claimed in claim 1, wherein the data transfer session is for transferring first data and comprises sending a sequence of packets including data transfer session packets interspersed with additional packets wherein the first data transfer session packets acknowledge transfer of the first data and the additional packets do not transfer the first data or acknowledge transfer of the first data but repeatedly reserve the communications channel.

12. A method as claimed in claim 1 wherein the communication channel is a time division duplex channel comprising frames having a downlink time slot and an uplink time slot, the method comprising sending a data transfer session packet in an uplink slot, then repeatedly sending additional packets in each uplink slot, thereby holding the communications channel, until the next data transfer in the downlink slot.

13. A method as claimed in claim 1, wherein the first data transfer session packet is a final packet of an OBEX, Object Exchange Protocol, CONTINUE response.

14. A method as claimed in claim 1, wherein the additional packets are packets sent by a Slave that obtain polls in reply from a master.

15. A method as claimed in claim 14, wherein a master on receiving a packet from a slave, during a data transfer session, polls that slave.

16. A method as claimed in claim 1, wherein the additional packets are selected from the group comprising: data packets with an empty payload and empty RFCOMM packets.

17. A device comprising:
a controller configured during a data transfer session to control the sending, via a communications channel to a destination, of a first data transfer session packet and the subsequent sending, via the communications channel to the destination, a series of additional packets to reserve the communications channel for multiple, consecutive time slots, for a second data transfer pack sent from the destination via the communications channel in response to the first data transfer session packet, wherein the additional packets are different to the first data transfer session packet.

18. A device as claimed in claim 17, wherein the device is configured either as a master or a slave and the communication channel is between a master and a slave, wherein a slave is configured to send a packet to the master only in response to a poll from the master.

19. A device as claimed in claim 18, wherein a master on receiving a packet from a slave, during a data transfer session, polls that slave.

20. A device as claimed in claim 19, wherein the communication channel is a time division duplex channel comprising frames including a downlink time slot and an uplink time slot.

21. A device as claimed in claim 19, wherein the data transfer session uses an asynchronous data transfer protocol.

22. A non-transitory computer program product tangibly embodying program instructions for enabling a device during a data transfer session
to send, to a destination via a communications channel, a first data transfer session packet, and
to subsequently send to the destination via the communications channel, a series of additional packets to reserve, for multiple, consecutive time slots, the communications channel for a second data transfer packet sent from the destination via the communications channel in response to the first data transfer session packet, wherein the additional packets are different to the first data transfer session packet.

23. A chipset arranged to control, during a data transfer session,
the sending, to a destination via communications channel, of a first data transfer session packet and
the subsequent sending, to the destination via the communications channel, of an additional packet or packets to reserve, for multiple, consecutive time slots, the communications channel for a second data transfer packet sent from the destination via the communications channel in response to the first data transfer session packet, wherein the additional packets are different to the first data transfer session packet.

24. A method comprising:
during the data transfer session,
sending, to a destination via a communications channel, a first data transfer session packet containing transfer data, then,
sending to the destination via the communications channel, an additional packet or packets that reserve the communications channel for a second data transfer session packet sent by the destination in response to the first data transfer session packet via the communications channel, wherein the additional packets do not contain transfer data.

25. A method as claimed in claim 24, wherein the data transfer session is for transferring first data and comprises sending a sequence of packets including first data transfer session packets interspersed with polls wherein the first data transfer session packets transfer the first data and the polls do not transfer the first data but each poll reserves the communications channel.

26. A method as claimed in claim 24, comprising sending a data transfer session packet, then repeatedly sending polls until receipt of an acknowledgement of receipt of the data transfer session packet.

27. A method as claimed in claim 24, wherein the data transfer session packet is a final packet of an OBEX, Object Exchange Protocol, PUT command.

28. A method as claimed in claim 24, wherein the additional packet and packets are selected from the group comprising: data packets with an empty payload; empty RFCOMM packets.

29. A device comprising:
means for sending, to a destination via a communications channel, a first data packet; and
means for sending, to the destination via the communications channel, an additional data session extension packet or packets after the first data packet, to reserve, for multiple, consecutive time slots, the communications channel for a second data transfer packet sent from the destination via the communications channel in response to the first data transfer session, packet, wherein the additional packets are different to the first data transfer session packet.

30. A method as claimed in claim 1, wherein the first data transfer session packet is sent, to the destination via the communications channel, in response to a packet received from the destination prior to said sending.

* * * * *

UNITED STATES PATENT AND TRADEMARK OFFICE
CERTIFICATE OF CORRECTION

| | |
|---|---|
| PATENT NO. | : 8,374,191 B2 |
| APPLICATION NO. | : 12/225031 |
| DATED | : February 12, 2013 |
| INVENTOR(S) | : Christian Zechlin et al. |

It is certified that error appears in the above-identified patent and that said Letters Patent is hereby corrected as shown below:

In the Claims:

In Claim 29:
Column 10, line 67, "session," should be deleted and -- session -- should be inserted.

Signed and Sealed this
Twenty-first Day of May, 2013

Teresa Stanek Rea
*Acting Director of the United States Patent and Trademark Office*